US012248528B2

(12) United States Patent
Burkart et al.

(10) Patent No.: US 12,248,528 B2
(45) Date of Patent: Mar. 11, 2025

(54) AUTOMATED AND SCALABLE MONITORING OF CHANGES TO SOFTWARE SERVICES

(71) Applicant: Boomi, LP, Chesterbrook, PA (US)

(72) Inventors: Dana Burkart, San Jose, CA (US); Eli Annoni, Walnut Creek, CA (US); Alejandro Flores, Mongaup Valley, NY (US)

(73) Assignee: Boomi, LP, Conshohocken, PA (US)

( * ) Notice: Subject to any disclaimer, the term of this patent is extended or adjusted under 35 U.S.C. 154(b) by 170 days.

(21) Appl. No.: 18/099,168

(22) Filed: Jan. 19, 2023

(65) Prior Publication Data
US 2024/0248943 A1    Jul. 25, 2024

(51) Int. Cl.
| | |
|---|---|
| *G06F 16/00* | (2019.01) |
| *G06F 11/30* | (2006.01) |
| *G06F 16/955* | (2019.01) |
| *G06F 16/958* | (2019.01) |

(52) U.S. Cl.
CPC ...... *G06F 16/9566* (2019.01); *G06F 11/3075* (2013.01); *G06F 16/958* (2019.01)

(58) Field of Classification Search
CPC . G06F 16/9566; G06F 16/958; G06F 11/3075
See application file for complete search history.

(56) References Cited

U.S. PATENT DOCUMENTS

| | | | | |
|---|---|---|---|---|
| 9,746,985 B1 * | 8/2017 | Humayun | ............. | G06F 16/904 |
| 10,990,940 B1 * | 4/2021 | Asthana | ................. | H04L 67/02 |
| 11,010,191 B1 * | 5/2021 | Hornbeck | ............. | H04L 67/133 |
| 2009/0265332 A1 * | 10/2009 | Mushtaq | ............ | G06Q 30/0245 |
| | | | | 707/999.005 |
| 2010/0174748 A1 * | 7/2010 | Strumpf | .................. | G06Q 30/02 |
| | | | | 707/E17.014 |
| 2012/0197896 A1 * | 8/2012 | Li | ......................... | G06F 16/313 |
| | | | | 707/E17.089 |
| 2015/0156061 A1 * | 6/2015 | Saxena | .................... | H04L 67/34 |
| | | | | 715/733 |
| 2015/0363481 A1 * | 12/2015 | Haynes | .................. | G06Q 10/10 |
| | | | | 707/748 |
| 2019/0073737 A1 * | 3/2019 | Marchio | ................. | G06Q 50/40 |
| 2021/0081179 A1 * | 3/2021 | Kenkre | .................... | G06F 9/451 |
| 2022/0100770 A1 * | 3/2022 | Gimple | ................. | G06F 16/256 |
| 2022/0214931 A1 * | 7/2022 | Devta | .................. | H04L 41/0843 |
| 2023/0325232 A1 * | 10/2023 | Enumulapally | ........... | G06F 9/46 |
| 2023/0393832 A1 * | 12/2023 | Touati | ..................... | H04L 67/10 |
| 2023/0395244 A1 * | 12/2023 | Peyrovian | .............. | G16H 40/67 |

\* cited by examiner

*Primary Examiner* — Leslie Wong
(74) *Attorney, Agent, or Firm* — Procopio, Cory, Hargreaves & Savitch LLP

(57) ABSTRACT

Currently, changes to third-party software services, such as the deprecation of certain components, must be manually monitored. Accordingly, embodiments are disclosed to automatically monitor changes to such services in a scalable manner. In particular, monitors may be configured to scrape webpages at URLs associated with deprecation or other information about the services, and manage review and resolution of each substantive change. The monitors may be used to facilitate up-to-date adapters for interfacing with the services in an integration platform as a service (iPaaS) platform.

13 Claims, 11 Drawing Sheets

500

510

[Select Company ▾]

[Service Name]

[Service Homepage]

[Service URL]

[Refresh Notification Schedule ▾]

[Notes]

530

☒ Blog index

[Allow these URLs to be indexed]

[Disallow these URLs from being indexed]

[Space-separated keywords to search]

540

☐ Multiple pages

[Submit]

- Select Company ▽ ← 510
- Service Name
- Service Homepage
- Service URL
- Refresh Notification Schedule ▽
- Notes
- ☒ Blog index ← 530
- Allow these URLs to be indexed
- Disallow these URLs from being indexed
- Space-separated keywords to search
- ☒ Multiple pages ← 540
- URL snippet to append to service URL (use '#' as page number placeholder)
- Page number start index
- Page number end index (inclusive)
- Page number step size
- Submit ← 520

To-Do List

Resolved, Refresh Suggested — 610

| Company | Service | Last Refreshed |
|---|---|---|
| Company A | Service A | 4 months ago |
| Company B | Service B | 5 minutes ago |

Outdated, Refresh Suggested — 620

| Company | Service | Last Refreshed | Refresh Schedule |
|---|---|---|---|
| Company C | Service C | 4 months ago | Quarterly |

Unresolved — 630

| Company | Service | Last Refreshed |
|---|---|---|
| Company D | Service D | 1 month ago |

FIG. 6

FIG. 7A
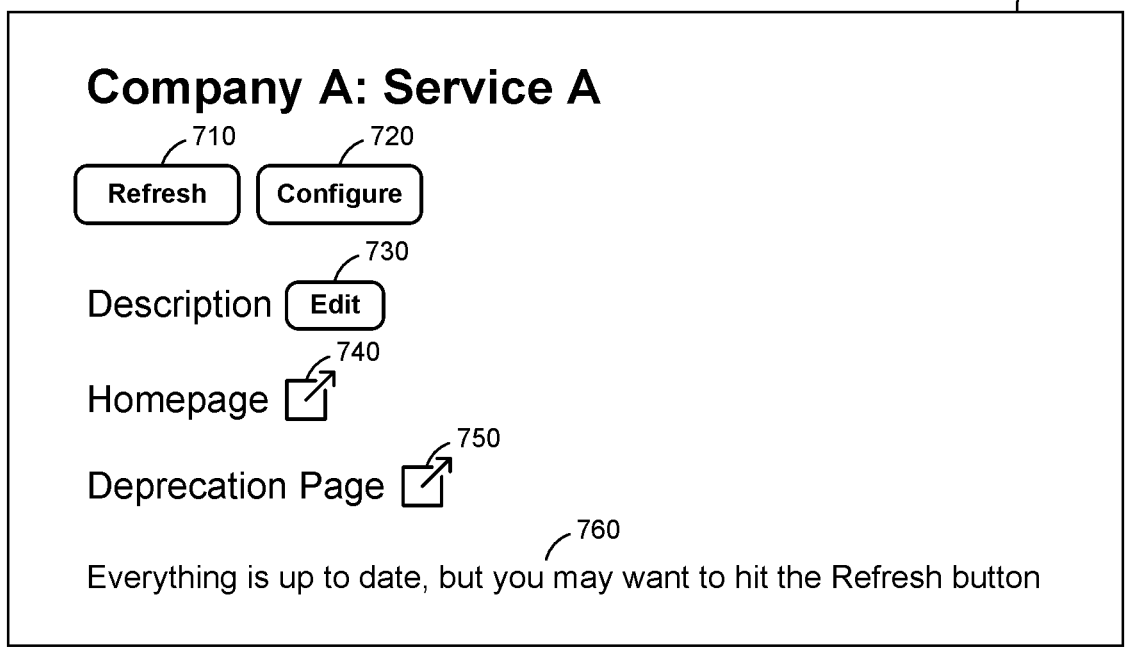
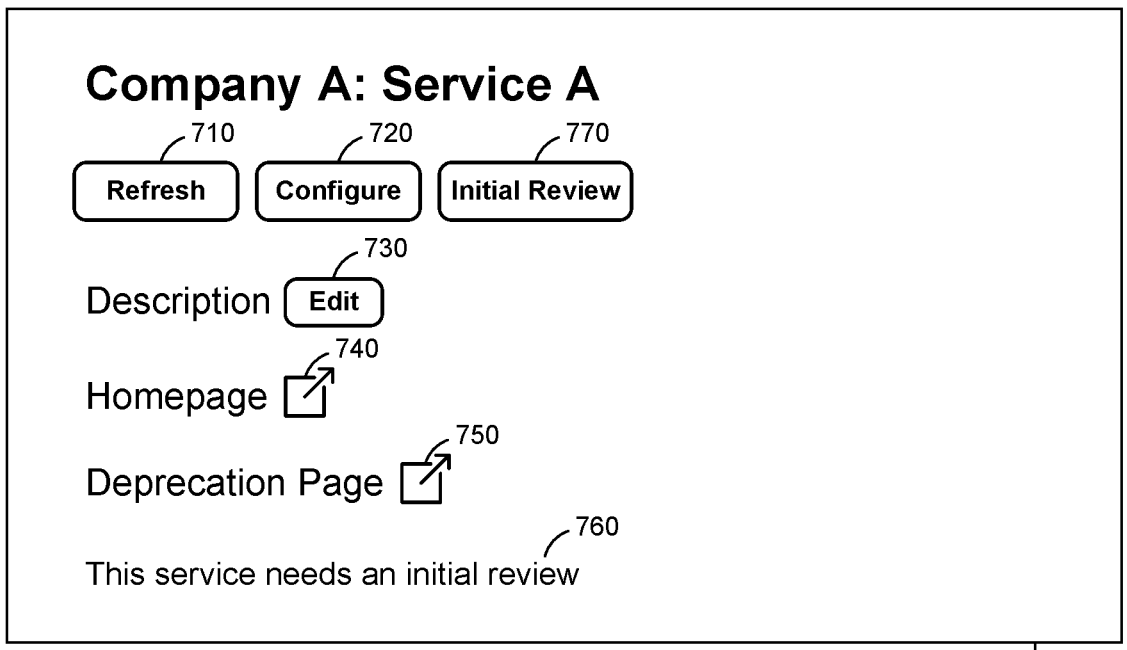
FIG. 7B

You are reviewing Company A: Service A. [Mark as Resolved]

Company A    Products  Solutions  Resources  Company  Pricing

Service A Software Lifecycle Schedules

The lifecycle schedules below form a part of Service A's Support Policies. They include Major Releases and Rapid Releases of the Service A Server and Service A Ops Manager that have reached their end of life date in the past 3 years.

Service A Server

| Release | Release Date | End of Life Date |
|---|---|---|
| 3.0 | March 2015 | February 2018 |
| 3.2 | December 2015 | September 2018 |
| 3.4 | November 2016 | January 2020 |
| 3.6 | November 2017 | April 2021 |
| 4.0 | June 2018 | April 2022 |
| 4.2 | August 2019 | April 2023 |
| 4.4 | July 2020 | February 2024 |
| 5.0 | July 2021 | October 2024 |

FIG. 8

AUTOMATED AND SCALABLE MONITORING OF CHANGES TO SOFTWARE SERVICES

BACKGROUND

Field of the Invention

The embodiments described herein are generally directed to automated and scalable monitoring of changes to software services, and, more particularly, to scraping webpages related to software services to identify discrepancies in the webpages over time and facilitate resolution of those discrepancies.

Description of the Related Art

A platform may rely on third-party software services. For example, Boomi® of Chesterbrook, Pennsylvania provides an integration platform as a service (IPaaS) platform that enables the integration of applications and data. These integrations may utilize connectors to third-party software services that rely on the application programming interfaces (APIs) of those third-party software services. More generally, any organization operating software may rely on a third-party software service outside of its control.

Over time, these third-party software services may change. For example, an API operation or version of the third-party software service may become deprecated or be retired. Such changes can break or otherwise hinder the operation of any software that relies on the third-party software service. Thus, generally, an operator of software that relies on third-party software services must regularly check webpages associated with these third-party software services to identify and respond to any changes in the third-party software services. Such a solution is not scalable, as the quantity of third-party software services—and therefore, the number of webpages to be checked—increases. In addition, such a solution is prone to human error.

Accordingly, what is needed is an automated and scalable mechanism for monitoring changes to third-party software services.

SUMMARY

Accordingly, systems, methods, and non-transitory computer-readable media are disclosed for automated and scalable monitoring of changes to software services.

In an embodiment, a method comprises using at least one hardware processor to: configure a monitor for a service based on one or more service parameters, wherein the one or more service parameters indicate a uniform resource locator (URL) for at least one webpage associated with the service; and, in each of a plurality of iterations, execute the configured monitor to scrape current data from the at least one webpage at the URL, and, when prior data has been scraped from the at least one webpage at a prior time, compare the current data to the prior data to determine whether or not any discrepancies exist between the current data and the prior data, and when determining that one or more discrepancies exist between the current data and the prior data, notify at least one recipient to review and resolve the one or more discrepancies. The method may further comprise using the at least one hardware processor to, in each of the plurality of iterations, when no prior data have been scraped from the at least one webpage at any prior time, prompt a user to perform an initial review of the at least one webpage. Prompting the user to perform an initial review of the at least one webpage may comprise generating a first screen of a graphical user interface comprising an input for performing the initial review of the at least one webpage. The method may further comprise using the at least one hardware processor to, in response to a selection of the input for performing the initial review of the at least one webpage, generate a second screen of the graphical user interface comprising an internal frame that comprises an input for resolving the initial review, and an external frame in which the at least one webpage is rendered. The method may further comprise using the at least one hardware processor to: store the current data as prior data for a subsequent one of the plurality of iterations; and, in response to a selection of the input for resolving the initial review, mark the initial review as resolved.

The one or more service parameters may indicate a time interval, and the method may further comprise using the at least one hardware processor to automatically execute one of the plurality of iterations after expiration of each of a plurality of the time interval.

The one or more service parameters may indicate a time schedule, and the method may further comprise using the at least one hardware processor to automatically execute the plurality of iterations according to the time schedule.

The at least one webpage may be a deprecation page which identifies any deprecations related to the service.

The one or more service parameters may comprise an indication that the at least one webpage is in a blog format, and scraping the current data from the at least one webpage at the URL may comprise identifying one or more blog entries referenced on the at least one webpage at the URL. The one or more service parameters may comprise one or more keywords, and identifying one or more blog entries may comprise identifying any blog entries, referenced on the at least one webpage at the URL, that match the one or more keywords.

The one or more service parameters may comprise an indication that the at least one webpage is a plurality of pages, and scraping the current data from the at least one webpage at the URL may comprise scraping the plurality of pages. The one or more service parameters may comprise one or more pagination parameters, including a URL snippet with a placeholder and a page number range, and scraping the plurality of pages may comprise, for each page number in the page number range: appending the URL snippet to an end of the URL and replacing the placeholder with the page number to create a composite URL; and scraping a webpage at the composite URL.

The method may further comprise using the at least one hardware processor to: execute a frontend service to generate a graphical user interface comprising one or more inputs for specifying the one or more service parameters, and receive the one or more service parameters via the one or more inputs; and execute a backend service to, in response to a user operation via the graphical user interface, instantiate a backend instance to execute, as the monitor, in a background. Scraping current data from the at least one webpage at the URL may comprise: executing the backend instance to instantiate a scraper instance via a scraper service; and executing the scraper instance to scrape the current data from the at least one webpage at the URL.

The method may further comprise using the at least one hardware processor to: generate a graphical user interface that comprises an indication of each of the one or more discrepancies determined to exist in one or more of the plurality of iterations, wherein the graphical user interface comprises one or more inputs for resolving the one or more discrepancies; and in response to resolution of all of the one or more discrepancies via the one or more inputs, mark the one or more discrepancies as resolved. The method may further comprise using the at least one hardware processor to, after one of the plurality of iterations is performed, preventing another iteration from being performed until or unless the one or more discrepancies have been marked as resolved.

The method may further comprise using the at least one hardware processor to: generate a graphical user interface that comprises an input for performing a refresh; and in response to a selection of the input for performing the refresh, performing one of the plurality of iterations.

The method may further comprise using the at least one hardware processor to configure and execute a monitor for each of a plurality of services, wherein each of the plurality of services is a third-party software service that interfaces with integration platforms provided by an integration platform as a service (iPaaS) platform via an adapter.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 5A-8 illustrate example screens of a graphical user interface that may be used for monitoring a service, according to an embodiment.

DETAILED DESCRIPTION

In an embodiment, systems, methods, and non-transitory computer-readable media are disclosed for automated and scalable monitoring of changes to software services. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
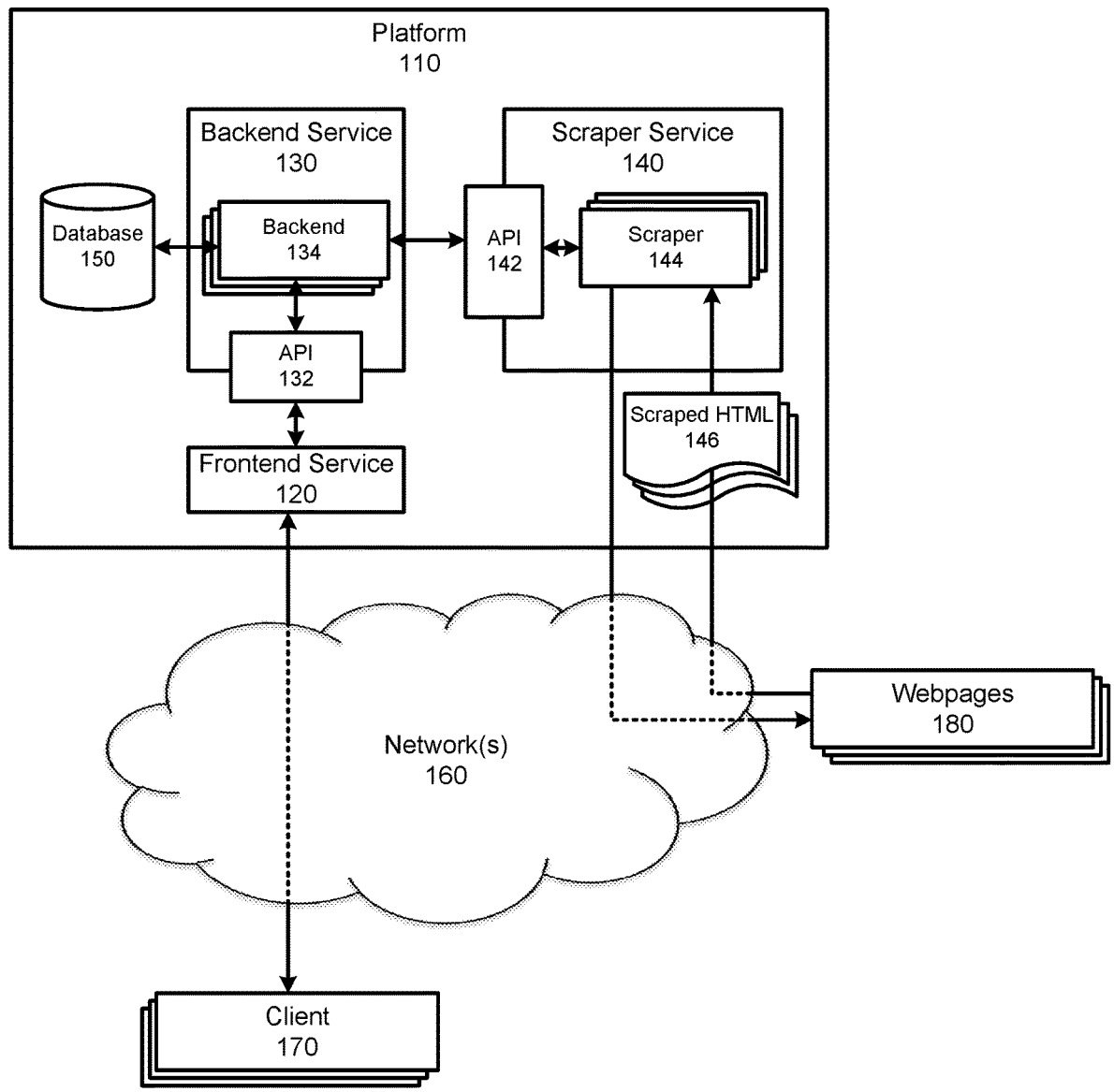
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various processes, methods, functions, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated (e.g., in a single data center) and/or geographically distributed (e.g., across a plurality of different data centers).

Platform 110 may host or be communicatively connected to a frontend service 120, a backend service 130, a scraper service 140, and a database 150. While only a single frontend service 120, backend service 130, scraper service 140, and database 150 are illustrated, it should be understood that platform 110 may utilize any number of frontend services 120, backend services 130, scraper services 140, and databases 150.

Frontend service 120 may be accessible via one or more networks 160, which may comprise the Internet. One or more clients 170 may communicate with frontend service 120 via network(s) 160, using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to clients 170 through a single set of network(s) 160, it should be understood that platform 110 may be connected to the various clients 170 via different sets of one or more networks. For example, platform 110 may be connected to a subset of clients 170 via the Internet, but may be connected to one or more other clients 170 via an intranet. Furthermore, while only a few clients 170 are illustrated, it should be understood that the infrastructure may comprise any number of clients 170.

Client(s) 170 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a client 170 would comprise the personal computer or professional workstation of a user that has a user account with platform 110. The user may utilize client 170 to login to the user account, via frontend service 120, in order to access various functions of platform 110 described herein. These functions may include configuring monitors for detecting changes to software services, and/or reviewing and resolving detected changes to software services.

Platform 110 may comprise web servers which host one or more websites and/or web services. In embodiments in which a website is provided, frontend service 120 may generate a graphical user interface, including, for example, one or more screens (e.g., webpages) generated in HyperText Markup Language (HTML) or other language. Frontend service 120 may transmit or serve one or more screens of the graphical user interface in response to requests from client(s) 170. In some embodiments, these screens may be served in the form of a wizard, in which case two or more screens may be served in a sequential manner, and one or more of the sequential screens may depend on an interaction of the user or client 170 with one or more preceding screens. The requests to frontend service 120 and the responses from frontend service 120, including the screens of the graphical user interface, may both be communicated through network(s) 160, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database 150) that are locally and/or remotely accessible to platform 110. It should be understood that frontend service 120 may also respond to other types of requests from client(s) 170.

In embodiments in which a web service is provided, frontend service 120 may receive requests from client(s) 170, and provide responses in extensible Markup Language (XML), JavaScript Object Notation (JSON), and/or any other suitable or desired format. In such embodiments, frontend service 120 may provide an application programming interface (API) which defines the manner in which client(s) 170 may interact with the web service. Thus, client(s) 170 (which may themselves be servers), can define their own user interfaces, and rely on the web service to implement or otherwise provide the processes described herein. For example, in such an embodiment, a client application, executing on one or more client(s) 170, may interact with frontend service 120 executing on platform 110 to execute one or more or a portion of one or more of the various processes, methods, functions, and/or software modules described herein.

Backend service 130 may provide a backend API 132, which may be a Representational State Transfer (REST) API. Frontend service 120 may communicate with backend service 130 via backend API 132. Backend service 130 may instantiate, configure, maintain, terminate, and otherwise manage one or more backend instances 134. Each backend instance 134 may represent a monitor that detects changes to a given software service and manages resolution of any detected changes.

Scraper service 140 may provide a scraper API 142, which may be a REST API. Each backend instance 134, managed by backend service 130, may communicate with scraper service 140 via scraper API 142. Scraper service 140 may instantiate, configure, maintain, terminate, and otherwise manage one or more scraper instances 144. Each scraper instance 144 may be instantiated by scraper service 140, in response to a request from a backend instance 134 via scraper API 142, to scrape one or more webpages 180 at a given Uniform Resource Locator (URL).

Each backend instance 134 may maintain a database connection with database 150 and cause scraper service 140 to instantiate and configure one or more scraper instances 144 via scraper API 142. For example, backend instance 134 may retrieve data from database 150 and utilize the retrieved data to configure scraper instance(s) 144 via scraper API 142. Additionally or alternatively, backend instance 134 may receive data, collected by scraper instance(s) 144, process the received data, and store the received and/or processed data in database 150.

Each scraper instance 144 may be configured with one or more Uniform Resource Locators (URLs). Scraper instance 144 utilizes headless browsing to scrape data from one or more webpages 180 at the configured URL(s), to produce scraped HTML data 146. As used herein, the term "scrape" refers to any data scraping technique in which software, such as scraper instance 144, extracts data from human-readable output, such as webpage(s) 180, produced by third-party software, such as a third-party website that releases information about a third-party software service. It should be understood that scraped HTML data 146, which may comprise or consist of the raw HTML code, represents information about the third-party software service that was published in webpage(s) 180. It should also be understood that the scraped HTML data 146 may comprise both data (e.g., human-readable text) from webpage(s) 180, as well as metadata within or about webpage(s) 180.

Scraper instance 144 may return the scraped HTML data 146 to an associated backend instance 134. Backend instance 134 may process the returned scraped HTML data 146 (e.g., according to one or more user specifications), store the scraped HTML data 146 and/or the processed data in database 150, and/or report the scraped HTML data 146 and/or the processed data to a user via frontend service 120. The processing by backend instance 134 may extract human-readable text from the raw HTML code in scraped HTML data 146. In an embodiment, both the raw HTML code and the extracted human-readable text are stored in database 150.

Platform 110 may comprise, be communicatively coupled with, or otherwise have access to database 150. For example, platform 110 may comprise one or more database servers which manage one or more databases, collectively forming database 150. Backend instance(s) 134 may submit data (e.g., scraped HTML data 146, processed data, etc.) to be stored in database(s) 150, and/or request access to data stored in database 150. Any suitable database technology may be utilized to implement database 150, including, without limitation, MySQL™, Oracle™, IBM™, Microsoft SQL™, Access™, PostgreSQL™, MongoDB™, and/or the like, including cloud-based database technologies and proprietary database technologies.

2. Example Processing Device

Figure 2:
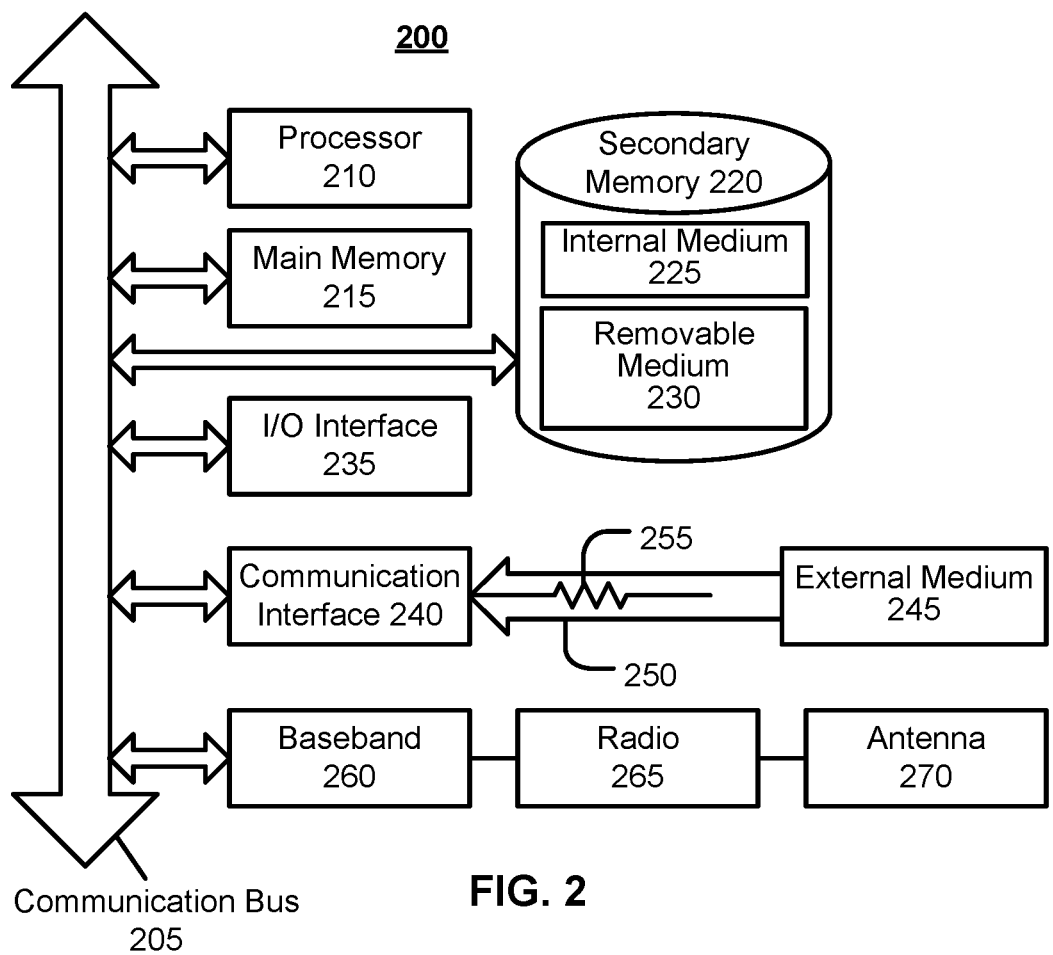
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the processes, methods, or functions (e.g., to store and/or execute any of the software) described herein, and may represent components of platform 110, client(s) 170, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, Python, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 160) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 160), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 200 may also include optional wireless communication components that facilitate wireless communication over a voice network and/or a data network (e.g., in the case of a client 170 that is a mobile device). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

3. Example State Diagram

Figure 3:
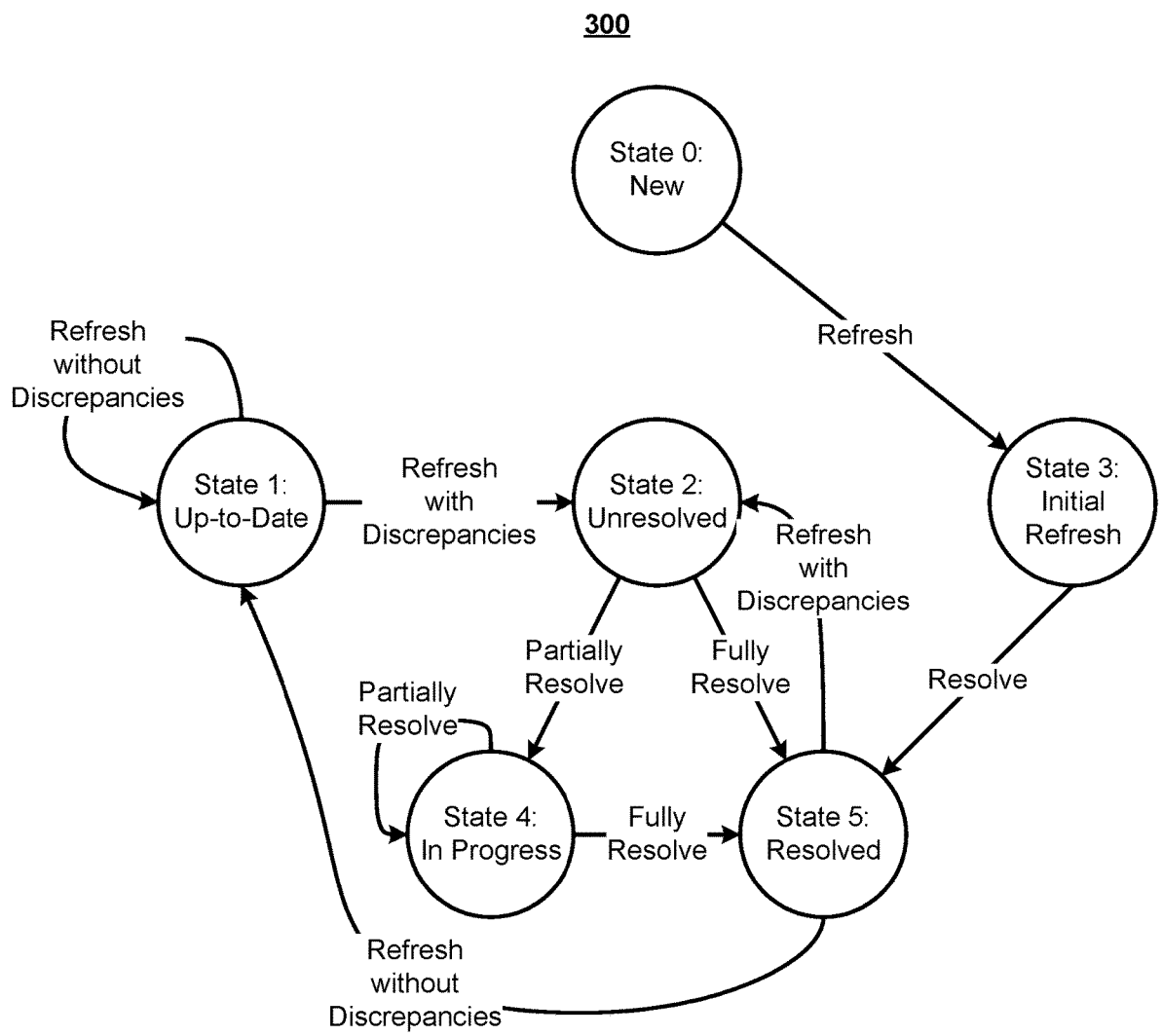
FIG. 3 illustrates a state diagram for monitoring a service, according to an embodiment.

FIG. 3 illustrates an example state diagram 300 for monitoring a service, such as a third-party software service, according to an embodiment. Each monitor for a given service may traverse the states in state diagram 300, starting from State 0. In particular, backend service 130 may instantiate a backend instance 134 for each service to be monitored and/or for each user. It should be understood that backend service 130 may monitor one or a plurality of services for each of one or a plurality of users, via various backend instances 134. Each backend instance 134 may monitor a service while traversing the refresh-resolve cycle in state diagram 300. While a certain arrangement of states and transitions is illustrated, it should be understood that state diagram 300 is one example, and that alternative embodiments may utilize different arrangements of states and transitions.

Each monitor, as implemented by a backend instance 134 in an embodiment, may maintain at least two sets of data. The first set of data, which may be denoted herein as "ReviewedDocument," may comprise data, representing information about the service that comprises or has been otherwise derived from scraped HTML data 146 for the service, that have been fully resolved. Data are fully resolved when all changes, represented as one or more discrepancies between the current data and past data, have been reviewed and resolved. Information is partially resolved when only a portion of the changes have been reviewed and resolved. The second set of data, which may denoted herein as "NextDocument," may comprise data, representing information about the service that comprises or has been otherwise derived from scraped HTML data 146 for the service, that have not yet been reviewed or resolved.

When a new monitor for a service is first instantiated, the monitor may begin in State 0. State 0 represents that no data have yet been scraped for the service. In this case, both ReviewedDocument and NextDocument may be set to null, indicating that no past or current data has been stored in either set of data.

After an initial refresh, the monitor will transition from State 0 to State 3. As used herein, the term "refresh" refers to an action by the monitor to scrape current data about a service from one or more URLs associated with that service. For example, backend instance 134 may instantiate a scraper instance 144 to scrape one or more current webpages 180 associated with the service, and scraper instance 144 may return the resulting scraped HTML data 146 to backend instance 134. The returned scraped HTML data 146 may be processed by backend instance 134 and the raw HTML code and/or processed data may be stored as current data in NextDocument in database 150 for review and resolution. After the initial refresh, ReviewedDocument will remain null.

Once the data stored in NextDocument have been fully resolved, the monitor may transition from State 3 to State 5, indicating that the data, resulting from the initial refresh, have been fully reviewed resolved. In State 5, the data stored in NextDocument may be copied to ReviewedDocument, such that ReviewedDocument is no longer null.

When the monitor refreshes while in State 5, the monitor will once again scrape the URL(s) associated with the service. For example, backend instance 134 may instantiate a scraper instance 144 to scrape one or more current webpages 180 associated with the service, and scraper instance 144 may return the resulting scraped HTML data 146 to backend instance 134. The returned scraped HTML data 146 may be processed by backend instance 134 and the raw HTML code and/or processed data may be stored as current data in NextDocument in database 150 for review and resolution.

Unlike in State 3, in State 5 there will be information stored in ReviewedDocument. Thus, the monitor may compare the current data in NextDocument to the past data in ReviewedDocument to determine whether or not there are any discrepancies. It should be understood that, in this case, each discrepancy represents a change between the current data and the past data for a service. If there are no discrepancies between the current data and the past data (e.g., NextDocument is substantively identical to ReviewedDocument), the current data in NextDocument do not need to be reviewed or resolved. In this case, the monitor transitions from State 5 to State 1. Otherwise, if there is at least one discrepancy between the current data and the past data (e.g., NextDocument is not substantively identical to ReviewedDocument), the current data in NextDocument need to be reviewed and resolved. In this case, the monitor transitions from State 5 to State 2.

State 1 indicates that the data about the service being monitored is up to date. When the monitor refreshes while in State 1, the monitor will once again scrape the URL(s) associated with the service to produce current data, which will be stored in NextDocument. If there are no discrepancies between the current data in NextDocument and the past data in ReviewedDocument, the monitor will remain in State 1. Otherwise, if there is at least one discrepancy between the current data in NextDocument and the past data in ReviewedDocument, the monitor transitions from State 1 to State 2.

State 2 indicates that there are one or more discrepancies, between the current data and the past data about the service, that need to be resolved. In other words, NextDocument and ReviewedDocument substantively differ. When only a subset of the discrepancies are resolved, State 2 transitions to State 4. Otherwise, when all discrepancies are resolved, the monitor transitions from State 2 to State 5.

State 4 indicates that the review process has been started but is still in progress, such that at least one discrepancy remains to be resolved. In other words, the discrepancies between the current data in NextDocument and the past data in ReviewedDocument are only partially resolved. The monitor may remain in State 4 until all discrepancies have been fully resolved. In other words, in an embodiment, the monitor cannot refresh until all discrepancies have been resolved. This ensures data integrity. However, in an alternative embodiment, the monitor may refresh even when the discrepancies are only partially resolved. In this case, a refresh in State 4 may cause the monitor to transition from State 4 to State 2 or to remain in State 4.

Once all discrepancies have been resolved while the monitor is in State 4, the monitor may transition from State 4 to State 5. In State 5, the data in NextDocument is copied to ReviewedDocument, to thereby overwrite the data in ReviewedDocument. In an embodiment, prior to being overwritten, the data in ReviewedDocument may be archived to a history for the service being monitored. The history, which may be stored in database 150, may retain all of the data scraped by the monitor for the service, all changes (i.e., discrepancies between two successive versions of the scraped data) detected since monitoring of the service began, and/or some other representation of the evolution of the service over time.

4. Example Process

Figure 4:
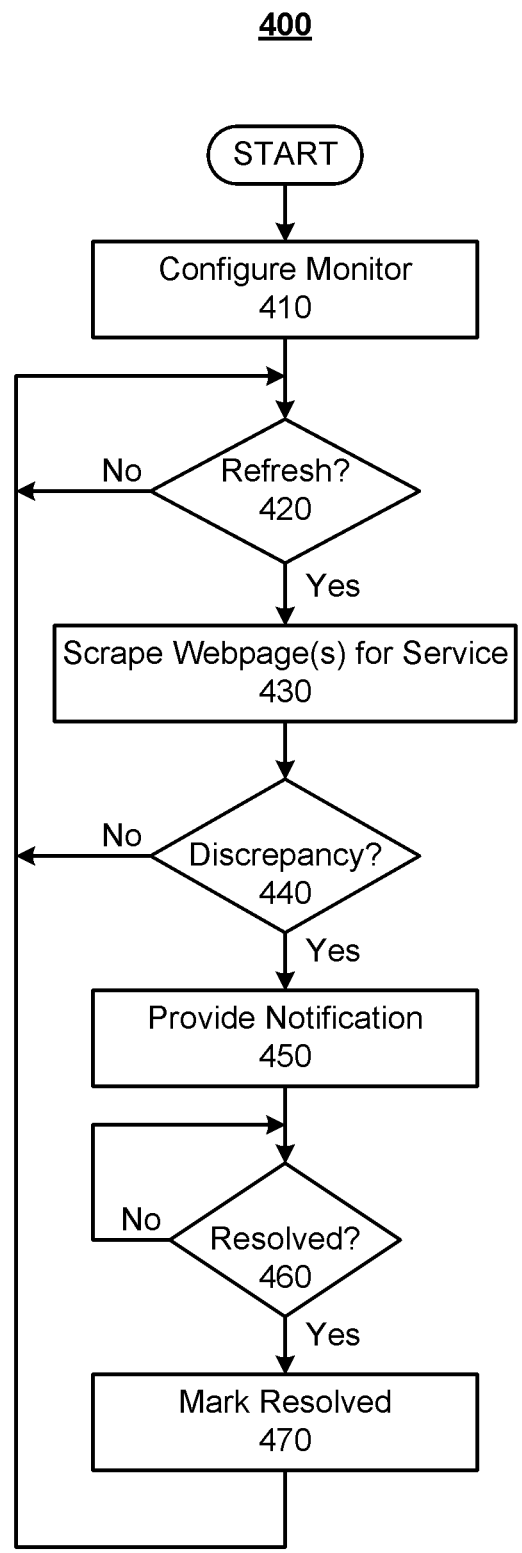
FIG. 4 illustrates a process for monitoring discrepancies in information about a service, according to an embodiment, according to an embodiment.

FIG. 4 illustrates a process 400 for monitoring discrepancies in information about a service, according to an embodiment. Process 400 may be embodied in one or more software modules that are executed by one or more hardware processors (e.g., processor 210), for example, as a software application comprising frontend service 120, backend service 130, and/or scraper service 140, which may be executed by processor(s) of platform 110. Process 400 may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, process 400 may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Initially, in subprocess 410, a monitor is configured for a service based on one or more service parameters. For example, frontend service 120 may generate a graphical user interface comprising one or more inputs for specifying the one or more service parameters. Frontend service 120 may receive the service parameter(s) via the input(s) of the graphical user interface, and provide the received service parameter(s) to backend service 130 via backend API 132. Upon receiving the service parameter(s), backend service 130 may instantiate a backend instance 134 to begin monitoring a service according to the service parameter(s).

In an embodiment, the service parameter(s) used to configure the monitor may comprise a company name, service name (e.g., a single company may offer a plurality of services), service homepage, a service URL, refresh schedule, notes, one or more blog parameters, and/or one or more pagination parameters. Examples of blog parameters include, without limitation, a whitelist of URLs to be indexed, a blacklist of URLs to be excluded from indexing, and/or one or more keywords. Examples of pagination parameters include, without limitation, a URL snippet to append to the service URL, a page number start index, a page number end index, and/or a page number step size.

The service URL represents or indicates the URL for at least one webpage, associated with the service, that is to be scraped by the monitor. For example, the webpage to be scraped may be a deprecation page on which a third party releases deprecation information about a third-party software service provided by the third party. In the event that a URL snippet is provided in the pagination parameters, the service URL may represent a base URL to which the URL snippet is appended to create one or more composite URLs. In this case, there may or may not be any webpage at the base URL to be scraped. However, there will be webpages at the composite URL(s) that may be scraped.

Figure 5A:
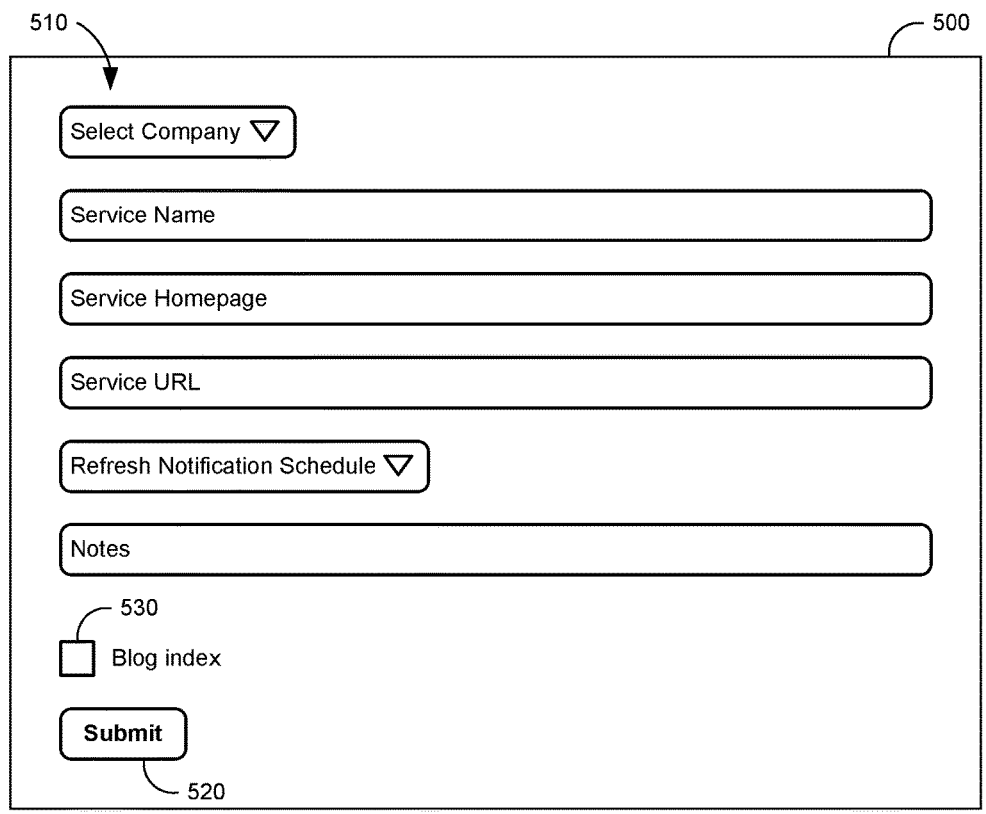

FIGS. 5A-5C illustrate an example screen 500 of a graphical user interface that may be generated to receive one or more service parameters for configuring a monitor in subprocess 410, according to an embodiment. Screen 500 may be generated by frontend service 120. As illustrated in FIG. 5A, screen 500 may comprise one or more inputs 510 for receiving one or more basic service parameters. For example, input(s) 510 may comprise a drop-down menu for selecting a company name from a list of available company names, a textbox for specifying a name of the service to be monitored, a textbox for specifying the URL of a homepage for the service to be monitored, a textbox for specifying the URL to be scraped, a drop-down menu for selecting a refresh schedule, and/or a textbox for entering any notes. The service URL may define the location of a deprecation page, managed by a third-party provider of the service, that indicates which functions or other components of a service have been deprecated. It should be understood that a deprecated component is one that has been retired from normal use and of which continued use is discouraged, but which has not been immediately removed from the codebase since doing so may cause errors in legacy applications that utilize the service. The refresh schedule may comprise or indicate a time interval or periodicity by which the monitor performs refreshes. Alternatively, the refresh schedule may comprise or indicate particular days and/or times on which the monitor should perform refreshes. In any case, the refresh schedule enables a user to set the cadence at which the webpage(s) at the service URL are scraped.

Screen 500 may also comprise an input 530 (e.g., checkbox) to indicate whether or not updates to the service to be monitored are released in a blog format. A blog format may require special processing. Thus, as illustrated in FIG. 5B, when input 530 is toggled on to indicate that the blog format is applicable, screen 500 may expand to include additional inputs 510 for receiving blog parameters as additional service parameters. For example, input(s) 510 for receiving blog parameters may comprise a textbox for specifying a whitelist of URLs to be indexed, a textbox for specifying a blacklist of URLs to be excluded from indexing, and/or a textbox for specifying keywords. The whitelist of URLs represents webpages of the blog that may be scraped, and the blacklist of URLs represents webpages of the blog that should not be scraped. The keywords, if any, may be used to identify relevant blog entries on webpage(s) 180. For example, blog entries that do not include any or all of the keywords, depending on the implementation or specified keyword operators, may be excluded from the scraping, whereas blog entries that do include any or all of the keywords, again depending on the implementation or specified keyword operators, may be included in the scraping. It is generally contemplated that the keyword(s) would relate to changes to a specific service, and therefore, would comprise terms related to deprecation (e.g., "deprecated") and/or the specific service (e.g., a common name or trademark used for the service).

Screen 500 may also comprise an input 540 (e.g., checkbox) to indicate whether or not the webpage at the service URL is paginated (e.g., a blog or deprecation page comprising a plurality of pages). Pagination may require special processing. Thus, as illustrated in FIG. 5C, when input 540 is toggled on to indicate that pagination is applicable, screen 500 may expand to include additional inputs 510 for receiving pagination parameters as additional service parameters. For example, input(s) 510 for receiving pagination parameters may comprise a textbox for specifying a URL snippet to be appended to the service URL, a textbox for specifying a starting index of the page numbers to be scraped, a textbox for specifying an ending index of the page number to be scraped, and/or a page number step size.

The URL snippet may comprise a character string to be appended to the specified service URL to produce a composite URL. The URL snippet may comprise a placeholder character (e.g., "#") in the position at which the page number appears in the composite URL. It should be understood that the URL snippet represents the portion of a URL (e.g., path) that is used for pagination. The page number starting index and page number ending index represent the range of page numbers that will be substituted into the placeholder, and the page number step size represents the step size of page numbers to be used, within the page number range defined by the starting and ending indices, when scraping webpages. For example, if the service URL is "www.example-service.com/deprecated/", the URL snippet is "page-#", the page number start index is "1", the page number end index is "10", and the page number step size is "2", the monitor will be configured to scrape the following composite URLs:

"www.example-service.com/deprecated/page-1";
"www.example-service.com/deprecated/page-3";
"www.example-service.com/deprecated/page-5";
"www.example-service.com/deprecated/page-7"; and
"www.example-service.com/deprecated/page-9".

Once the user has specified all of the desired service parameter(s), including any blog parameters and/or pagination parameters, the user may select an input 520 for saving the specified service parameter(s) as the configuration of the monitor. When the user saves the service parameter(s) (e.g., by selecting input 520), the monitor may be generated and configured in subprocess 410 according to the service parameter(s). In particular, backend service 130 may instantiate and configure a backend instance 134, according to the service parameter(s), to begin monitoring the service.

In subprocess 420, it is determined whether or not the monitor is to perform a refresh. For example, as mentioned above, one of the service parameters may be a refresh schedule. The refresh schedule may specify a time interval or particular days and/or times at which the monitor should perform a refresh. In the case of a time interval, the monitor may be triggered to perform a refresh upon the expiration of each time interval (e.g., determined using a countdown timer). In the case of particular days and/or times, the monitor may be triggered to perform a refresh at each particular day and/or time. Alternatively or additionally, the monitor may perform a refresh in response to a user operation (e.g., upon user selection of an input within the graphical user interface provided by frontend service 120) and/or in response to another triggering event. In any case, when it is determined that the monitor is to perform a refresh (i.e., "Yes" in subprocess 420), the monitor proceeds to subprocess 430. Otherwise (i.e., "No" in subprocess 420), the monitor continues to wait until a refresh is triggered.

FIG. 6 illustrates an example screen 600 of a graphical user interface that may be used by a user to manage monitors which the user has created and/or for which the user is responsible. Screen 600 may comprise a table 610 listing monitors that are in an up-to-date or resolved state (e.g., State 1 or 5), a table 620 listing monitors that are outdated (e.g., in State 1 or 5, but past due for a refresh), and a table 630 listing monitors that are in an unresolved state (e.g., State 2 or 4). Each table 610, 620, and/or 630 may comprise a row for each service, including columns containing a company name, a service name with a link (e.g., hyperlink) or other input for navigating to a screen for reviewing details for the monitor for that service, and a time duration since the monitor last performed a refresh or a time at which the monitor last performed a refresh. In addition, the rows for services that are monitored according to a time interval may comprise the refresh schedule (e.g., daily, weekly, monthly, quarterly, annually, etc.).

In subprocess 430, the monitor scrapes one or more webpages for the service for which the monitor was configured. As discussed elsewhere herein, the service URL(s) of the webpage(s) to be scraped may be specified in the service parameter(s) in the configuration of the monitor. For example, the service URL may be the URL of the deprecation page associated with the service. Alternatively, the service URL may be a base URL, and the service parameters may further comprise a URL snippet that is combined with the base URL to construct one or more composite URLs. For instance, for each page number in the page number range specified in the service parameters of the configuration of the monitor, the URL snippet can be appended to the end of the service URL and a placeholder character in the URL snippet can be replaced with the page number to create a composite URL of a webpage to be scraped. Additionally or alternatively, the service parameter(s) may comprise a whitelist of URLs. The monitor may retrieve and/or construct each URL that is to be scraped from the service parameter(s), and then scrape each webpage at the resulting URL(s).

In particular, a backend instance 134, implementing the monitor, may instantiate a scraper instance 144, via scraper API 142, to scrape webpage(s) 180. Backend instance 134 may instantiate an individual scraper instance 144 for each URL or may instantiate a single scraper instance 144 for all URL(s). In either case, scraper instance(s) 144 crawl webpages 180 to produce scraped HTML data 146, which is then returned to backend instance 134 via scraper API 142.

All data in webpage(s) 180 at the URL(s) may be scraped and/or retained by the monitor. However, in an embodiment, when keyword(s) are provided, only webpage(s) 180 that match the keyword(s) are scraped and/or retained by the monitor. In an alternative embodiment, the monitor (e.g., backend instance 134 or scraper instance 144) may apply a machine-learning or rules-based algorithm to webpage(s) 180 to determine whether or not webpage(s) 180 are relevant (e.g., contain deprecation information or other updates about the service being monitored). In this case, only those webpage(s) 180 that are determined to be relevant by the algorithm may be scraped and/or retained. For example, if the algorithm is a machine-learning algorithm, the machine-learning algorithm may be trained to classify text into two or more classes, with a first class indicating irrelevance and at least one second class indicating relevance. The machine-learning algorithm may then be applied to the text scraped from each webpage 180 to classify the webpage 180 as either relevant or irrelevant, and the monitor may discard webpage(s) 180 or text that is classified as irrelevant, while retaining webpage(s) 180 or text that is classified as relevant.

In subprocess 440, the monitor determines whether or not there are any discrepancies between the newly scraped HTML data 146, returned by subprocess 430 and representing current data, and previously scraped HTML data 146, returned by a prior iteration of subprocess 430 and representing past data. In particular, a backend instance 134, implementing the monitor, may compare the newly scraped HTML data 146 to the previously scraped HTML data 146. For example, the current data in NextDocument may be compared to the prior data in ReviewedDocument to identify all differences between the two sets of data. Any substantive difference will be considered a discrepancy. Non-substantive differences (e.g., correction of typographical or grammatical errors, non-substantive changes in wording, etc.) may be ignored. If this is the initial refresh for the monitor, there will not be any previously scraped HTML data 146 (e.g., ReviewedDocument is null), in which case a discrepancy may be determined to exist to force an initial review and resolution. When no discrepancy is determined to exist (i.e., "No" in subprocess 440), the monitor returns to subprocess 420 to await the next refresh. In this case, the monitor may transition to State 1, indicating that all information about the service is up to date and previously resolved. On the other hand, when at least one discrepancy is determined to exist (i.e., "Yes" in subprocess 440), the monitor proceeds to subprocess 450. In this case, the monitor may transition to State 3 after an initial refresh or State 2 after any refresh other than the initial refresh.

In subprocess 450, a notification may be provided to one or more recipients. The recipient(s) may comprise the user of platform 110 who created the monitor and/or one or more other users or individuals. Each recipient may be identified by a unique identifier (e.g., internal user identifier, email address, mobile telephone number, etc.) in the configuration (e.g., service parameters) of the monitor. The notification may comprise an internal message (e.g., via an internal messaging system of platform 110) to an inbox of the user account of the recipient, an indication in a dashboard of the graphical user interface provided by frontend service 120 when a user is logged in to platform 110, an email message to an email address of the recipient, a text message (e.g., Short Message Service (SMS) message, Multimedia Messaging Service (MMS) message, etc.) to a mobile telephone number of the recipient, a voice recording communicated to a telephone number of the recipient, and/or the like.

The notification may comprise a link or other input or mechanism for accessing a screen of the graphical user interface, provided by frontend service 120, to review and resolve any of the discrepancies detected in subprocess 440. In the event that an initial refresh was performed in the most recent iteration of subprocess 430, the notification may prompt the recipient(s) to perform an initial review of the scraped data.

Figure 7C:
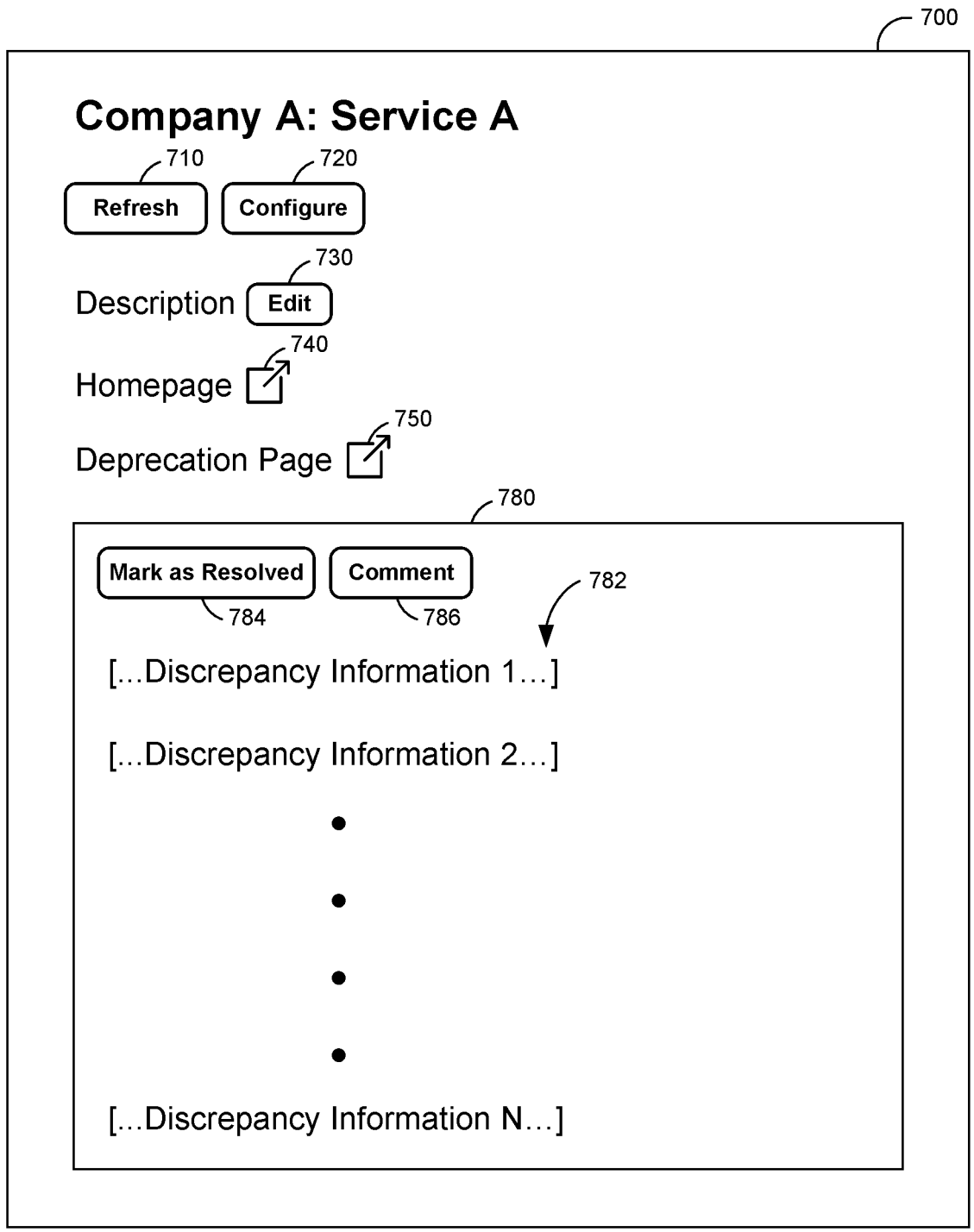

FIGS. 7A-7C illustrate an example screen 700 of a graphical user interface that may be used to both manage a monitor and review and resolve any discrepancies, according to an embodiment. Screen 700 may be reachable, for example, via the link or other input in the service name column in tables 610, 620, and/or 630 in screen 600 and/or via one or more other inputs at one or more other entry points within the graphical user interface provided by frontend service 120.

Screen 700 may comprise an input 710 for initiating a refresh by the monitor, an input 720 for editing the configuration of the monitor (e.g., editing one or more service parameters), an input 730 for editing a description of the monitor, an input 740 for viewing the service homepage specified for the service being monitored, an input 750 for viewing the service URL specified for the service being monitored, and a notification area 760 for providing pertinent information related to the monitor.

In FIG. 7A, the monitor is in State 1. Thus, notification area 760 indicates that everything is up to date, but suggests a refresh. Although not illustrated, in an embodiment, screen 700 may comprise a history or a link to a history of the service being monitored. The history may comprise all of the data scraped by the monitor for the service, a representation of all resolved discrepancies and/or a change log derived from the resolved discrepancies, and/or some other representation of the evolution of the service over time. In an embodiment, the history comprises the raw HTML code 146 that was scraped from a webpage 180 during each refresh, such that a user can view all prior versions of webpage 180. The history may also comprise information about each review and/or resolution (e.g., the identity of the user who performed the review or resolution, the date of the review or resolution, etc.). It should be understood that, before the initial review, there may be no history, in which case the history may be blank or the link to the history may be omitted or disabled.

In FIG. 7B, the monitor is in State 3. Thus, notification area 760 indicates that the services needs an initial review. In this case, screen 700 comprises an additional input 770 for performing the initial review. When the user selects input 770, the graphical user interface may redirect the user to a screen for performing the initial review. When the monitor is in any state other than State 3, input 770 may be omitted or disabled.

In FIG. 7C, the monitor is in either State 2 or State 4. In this case, screen 700 comprises a review area 780. Review area 780 may comprise a list 782 of discrepancies that were detected in subprocess 440. Each discrepancy in list 782 may be represent the difference between the current data and the prior data. For example, each difference may be represented as a "redlined" version of the current data, showing each addition and/or deletion, relative to the prior data. Alternatively, each difference may be represented as a juxtaposition of the current data to the prior data. Review area 780 may also comprise an input 784 for marking all of the discrepancies in list 782 as resolved, and an input 786 for adding a comment to be stored in association with list 782. Alternatively, review area 780 may comprise an input 784 and/or 786 for each discrepancy in list 782, such that each discrepancy may be individually resolved and/or commented upon (e.g., to indicate the relative importance of the change represented by the discrepancy), independently of other discrepancies. Resolved discrepancies may be removed from review area 780 or distinguished within review area 780, as they are resolved. In some cases, it may take more time to resolve some discrepancies than other discrepancies. For example, it may take days or weeks to research whether or not a particular change makes a difference to software that interfaces with the service being monitored. Once the user resolves all of the discrepancies, the monitor may transition to State 5. Otherwise, if the user resolves only a portion of the discrepancies, the monitor may transition to or remain in State 4.

When the monitor is monitoring a service that releases updates in a blog format, review area 780 may comprise a list of new blog entries, as identified using the specified blog parameters. For example, only new blog entries on webpage(s) 180 that match keyword(s) specified in the blog parameters may be listed in review area 780. Similarly, only new blog entries that appear on pages defined by the pagination parameters may be listed in review area 780. Non-matching blog entries are not considered as discrepancies, even if they are new. It should be understood that a blog entry is considered new if it was posted between the most recent refresh (e.g., the most recent iteration of subprocess 430) and the refresh that immediately preceded the most recent refresh (e.g., the iteration of subprocess 430 immediately preceding the most recent iteration of subprocess 430). The list of new blog entries may comprise information about each new blog entry, such as the title of the blog entry, matched keywords, a URL of the blog entry, the content or a snippet of the content of the blog entry, and/or the like.

FIG. 8 illustrates an example screen 800 of a graphical user interface that may be used to perform an initial review, according to an embodiment. For example, screen 800 may be displayed in response to selection of input 770 in screen 700 in FIG. 7B, when the monitor is in State 3. Screen 800 may comprise an internal frame 810 that is generated by frontend service 120 with input 784, and an external frame 820 that renders the webpage 180 (e.g., service deprecation page) at the service URL specified in the service parameter(s) in the configuration of the monitor. In other words, the graphical user interface of frontend service 120 maintains control over screen 800 via internal frame 810, while simultaneously enabling the user to view webpage 180 within external frame 820. Thus, the user may perform an initial review of the deprecation page within external frame 820, and, following that review, select input 784 in internal frame 810. In response to the user selecting input 784, frontend service 120, which has retained control via internal frame 810, may communicate with the backend instance 134, implementing the monitor, to mark the initial review as resolved, such that the monitor transitions from State 3 to State 5. In addition, frontend service 120 may responsively return the user to screen 700 in FIG. 7A.

In subprocess 460, the monitor determines whether all discrepancies have been resolved. When at least one discrepancy remains to be resolved (i.e., "No" in subprocess 460), the monitor may wait until all discrepancies have been resolved. In this case, the monitor may be in State 2 (i.e., if no discrepancies have been resolved) or State 4 (i.e., if the discrepancies have been partially resolved). When no discrepancies remain to be resolved (i.e., "Yes" in subprocess 460), the monitor marks the discrepancies as resolved in subprocess 470, and then waits for the next refresh in subprocess 420. In this case, the monitor may be in State 5.

It should be understood that process 400 may continue operating indefinitely, until and unless it is terminated by the user. For example, a user may login to platform 110 via frontend service 120 to delete or disable the monitor. In response, backend service 130 may delete or suspend the backend instance 134 that implements the monitor.

5. Example Embodiment

Disclosed embodiments provide an infrastructure and graphical user interface that can be used to configure monitors (e.g., backend instances 134). Each monitor may automatically track a website on which information about a service is released, in order to automatically detect changes to that information. The changes are detected by identifying discrepancies between a recently acquired version of the information and a past version of the information. In addition, the monitor may maintain various states to ensure that each discrepancy is resolved by a user, to ensure that the user reviews and is made aware of each detected change.

The service that is monitored may be any type of service. However, it is generally contemplated that the service is a third-party software service that is utilized by software managed by the user. For example, a platform that is managed by the user may interface with the third-party software service (e.g., via an API of the third-party software service and/or an API of the platform). In a particular embodiment, the user may manage an integration platform that retrieves data from the third-party software service and/or transmits data to the third-party software service.

For instance, Boomi® provides an iPaaS platform, which may be utilized by a plurality of users to develop and operate dynamic, cloud-based integration platforms. Integrations within these integration platforms may receive and/or transmit data to third-party software services by way of adapters. Changes to a third-party software service, such as changes to the API provided by the third-party software service, may affect the operation of these adapters. For example, the retirement of a function in the API of the third-party software service may cause adapters that utilize that function to malfunction. Even if a function is merely deprecated, the developer of the adapter may still wish to update the adapter to only utilize un-deprecated functions, in order to ensure the longevity of the adapter and avoid any potential future problems that may arise.

In an embodiment, platform 110 provides a centralized location that automatically monitors all changes to all supported services, and notifies a user of any changes that are detected. Platform 110 may also provide a graphical user interface, via frontend service 120, to allow users to review and resolve all changes to the services. The automation and centralization provided by platform 110 minimizes manual work, improves scalability, and enables a plurality of users to engage with the same information to quickly resolve changes.

Platform 110 may be a component of an iPaaS platform or interface with an iPaaS platform, to enable administrative users, representing an operator of the iPaaS platform, to identify changes to third-party software services that are supported by the iPaaS platform. In this case, these administrative users may review discrepancies, as discussed elsewhere herein, to determine whether or not any of the changes, represented by these discrepancies, require changes to components of the iPaaS platform. For example, a change to a third-party software service may require a change to an adapter, offered by the iPaaS platform, for communications between the third-party software service and integration platforms managed through the iPaaS platform. If the change does not warrant a change to the adapter, the discrepancy can be resolved without further action. Otherwise, the corresponding adapter may be updated or a ticket may be opened to update the corresponding adapter, before the administrative user marks the discrepancy as resolved. In this manner, the iPaaS platform can maintain up-to-date adapters for all supported services.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
    configure a monitor for a service based on one or more service parameters, wherein the one or more service parameters indicate a uniform resource locator (URL) for at least one webpage associated with the service, wherein the at least one webpage is a deprecation page which identifies any deprecations related to the service, and wherein the service is a third-party software service that interfaces with an integration platform via an adapter;
    execute a backend service to instantiate a backend instance to execute, as the configured monitor, in a background; and,
    in each of a plurality of iterations, execute the configured monitor to
        scrape current data from the at least one webpage at the URL, wherein scraping current data from the at least one webpage at the URL comprises executing the backend instance to instantiate a scraper instance via a scraper service, and executing the scraper instance to scrape the current data from the at least one webpage at the URL, when no prior data have been scraped from the at least one webpage at any prior time, prompt a user to perform an initial review of the at least one webpage, wherein prompting the user to perform an initial review of the at least one webpage comprises generating a first screen of a graphical user interface comprising an input for performing the initial review of the at least one webpage, in response to a selection of the input for performing the initial review of the at least one webpage, generate a second screen of the graphical user interface comprising an internal frame that comprises an input for resolving the initial review, and an external frame in which the at least one webpage is rendered, store the current data as prior data for a subsequent one of the plurality of iterations, and in response to a selection of the input for resolving the initial review, mark the initial review as resolved, and, when prior data has been scraped from the at least one webpage at a prior time, compare the current data to the prior data to determine whether or not any discrepancies exist between the current data and the prior data, and when determining that one or more discrepancies exist between the current data and the prior data, notify at least one recipient to review and resolve the one or more discrepancies, and block the monitor until all of the one or more discrepancies have been resolved.

2. The method of claim 1, wherein the one or more service parameters indicate a time interval, and wherein the method further comprises using the at least one hardware processor to automatically execute one of the plurality of iterations after expiration of each of a plurality of the time interval.

3. The method of claim 1, wherein the one or more service parameters indicate a time schedule, and wherein the method further comprises using the at least one hardware processor to automatically execute the plurality of iterations according to the time schedule.

4. The method of claim 1, wherein the one or more service parameters comprise an indication that the at least one webpage is in a blog format, and wherein scraping the current data from the at least one webpage at the URL comprises identifying one or more blog entries referenced on the at least one webpage at the URL.

5. The method of claim 4, wherein the one or more service parameters comprise one or more keywords, and wherein identifying one or more blog entries comprises identifying any blog entries, referenced on the at least one webpage at the URL, that match the one or more keywords.

6. The method of claim 1, wherein the one or more service parameters comprise an indication that the at least one webpage is a plurality of pages, and wherein scraping the current data from the at least one webpage at the URL comprises scraping the plurality of pages.

7. The method of claim 6, wherein the one or more service parameters comprise one or more pagination parameters, including a URL snippet with a placeholder and a page number range, and wherein scraping the plurality of pages comprises, for each page number in the page number range:

appending the URL snippet to an end of the URL and replacing the placeholder with the page number to create a composite URL; and scraping a webpage at the composite URL.

8. The method of claim 1, further comprising using the at least one hardware processor to all execute a frontend service to generate a graphical user interface comprising one or more inputs for specifying the one or more service parameters, and receive the one or more service parameters via the one or more inputs.

9. The method of claim 1, further comprising using the at least one hardware processor to:

generate a third screen of the graphical user interface that comprises an indication of each of the one or more discrepancies determined to exist in one or more of the plurality of iterations, and one or more inputs for resolving the one or more discrepancies; and in response to resolution of all of the one or more discrepancies via the one or more inputs, mark the one or more discrepancies as resolved.

10. The method of claim 1, further comprising using the at least one hardware processor to:

generate at least one screen of the graphical user interface to comprise an input for performing a refresh; and in response to a selection of the input for performing the refresh, perform one of the plurality of iterations.

11. The method of claim 1, further comprising using the at least one hardware processor to configure and execute a monitor for each of a plurality of services, wherein each of the plurality of services is a third-party software service that interfaces with integration platforms provided by an integration platform as a service (iPaaS) platform via an adapter.

12. A system comprising:

at least one hardware processor; and one or more software modules that are configured to, when executed by the at least one hardware processor, configure a monitor for a service based on one or more service parameters, wherein the one or more service parameters indicate a uniform resource locator (URL) for at least one webpage associated with the service, wherein the at least one webpage is a deprecation page which identifies any deprecations related to the service, and wherein the service is a third-party software service that interfaces with an integration platform via an adapter, execute a backend service to instantiate a backend instance to execute, as the configured monitor, in a background, and, in each of a plurality of iterations, execute the configured monitor to scrape current data from the at least one webpage at the URL, wherein scraping current data from the at least one webpage at the URL comprises executing the backend instance to instantiate a scraper instance via a scraper service, and executing the scraper instance to scrape the current data from the at least one webpage at the URL, when no prior data have been scraped from the at least one webpage at any prior time, prompt a user to perform an initial review of the at least one webpage, wherein prompting the user to perform an initial review of the at least one webpage comprises generating a first screen of a graphical user interface comprising an input for performing the initial review of the at least one webpage, in response to a selection of the input for performing the initial review of the at least one webpage, generate a second screen of the graphical user interface comprising an internal frame that comprises an input for resolving the initial review, and an external frame in which the at least one webpage is rendered, store the current data as prior data for a subsequent one of the plurality of iterations, and in response to a selection of the input for resolving the initial review, mark the initial review as resolved, and, when prior data has been scraped from the at least one webpage at a prior time, compare the current data to the prior data to determine whether or not any discrepancies exist between the current data and the prior data, and when determining that one or more discrepancies exist between the current data and the prior data, notify at least one recipient to review and resolve the one or more discrepancies, and block the monitor until all of the one or more discrepancies have been resolved.

13. A non-transitory computer-readable medium having instructions stored therein, wherein the instructions, when executed by a processor, cause the processor to:

configure a monitor for a service based on one or more service parameters, wherein the one or more service parameters indicate a uniform resource locator (URL) for at least one webpage associated with the service, wherein the at least one webpage is a deprecation page which identifies any deprecations related to the service, and wherein the service is a third-party software service that interfaces with an integration platform via an adapter;

execute a backend service to instantiate a backend instance to execute, as the configured monitor, in a background; and, in each of a plurality of iterations, execute the configured monitor to scrape current data from the at least one webpage at the URL, wherein scraping current data from the at least one webpage at the URL comprises executing the backend instance to instantiate a scraper instance via a scraper service, and executing the scraper instance to scrape the current data from the at least one webpage at the URL, when no prior data have been scraped from the at least one webpage at any prior time, prompt a user to perform an initial review of the at least one webpage, wherein prompting the user to perform an initial review of the at least one webpage comprises generating a first screen of a graphical user interface comprising an input for performing the initial review of the at least one webpage, in response to a selection of the input for performing the initial review of the at least one webpage, generate a second screen of the graphical user interface comprising an internal frame that comprises an input for resolving the initial review, and an external frame in which the at least one webpage is rendered, store the current data as prior data for a subsequent one of the plurality of iterations, and in response to a selection of the input for resolving the initial review, mark the initial review as resolved, and, when prior data has been scraped from the at least one webpage at a prior time, compare the current data to the prior data to determine whether or not any discrepancies exist between the current data and the prior data, and when determining that one or more discrepancies exist between the current data and the prior data, notify at least one recipient to review and resolve the one or more discrepancies, and block the monitor until all of the one or more discrepancies have been resolved.

* * * * *